US005083826A

United States Patent [19]

McCrary

[11] Patent Number: 5,083,826

[45] Date of Patent: * Jan. 28, 1992

[54] MOBILE PROMOTIONAL VEHICLE

[76] Inventor: Marcus R. McCrary, 18711 Fortson Ave., Dallas, Tex. 75252

[ * ] Notice: The portion of the term of this patent subsequent to Apr. 9, 2008 has been disclaimed.

[21] Appl. No.: 571,166

[22] Filed: Aug. 20, 1990

Related U.S. Application Data

[63] Continuation-in-part of Ser. No. 429,030, Oct. 30, 1989, Pat. No. 5,005,893.

[51] Int. Cl.[5] .......... B60R 13/00

[52] U.S. Cl. .......... 296/21; 296/24.1; 296/181; 296/183; 362/80; 40/559; 40/590; 40/611

[58] Field of Search .......... 296/21, 24.1, 181, 183; 362/61, 80; 40/479, 480, 559, 560, 588, 589, 590, 591, 611

[56] References Cited

U.S. PATENT DOCUMENTS

| | | | |
|---|---|---|---|
| 3,510,975 | 5/1970 | Lowmaster | 40/591 |
| 3,740,882 | 6/1973 | Lanphere et al. | 40/591 |
| 3,744,839 | 7/1973 | Stoneburner | 296/181 X |
| 3,924,344 | 12/1975 | Davis | 40/611 X |
| 4,446,643 | 5/1984 | Fujita et al. | 40/590 |
| 4,492,049 | 1/1985 | Gaylor | 40/624 |
| 4,502,725 | 3/1985 | Wiant | 296/181 |
| 4,749,221 | 6/1988 | Scott | 296/181 X |
| 4,753,026 | 6/1988 | Woodman et al. | 40/584 |
| 4,756,107 | 7/1988 | Hillstrom | 40/590 X |
| 4,782,615 | 11/1988 | Futatsuishi et al. | 40/591 |
| 4,818,024 | 4/1989 | Michel | 296/181 X |
| 4,839,776 | 6/1989 | Grossnickle | 362/80 X |
| 5,005,893 | 4/1991 | McCrary | 296/21 |

FOREIGN PATENT DOCUMENTS

| | | | |
|---|---|---|---|
| 967809 | 8/1964 | United Kingdom | 296/183 |
| 2126536 | 3/1984 | United Kingdom | 296/181 |

*Primary Examiner*—Margaret A. Focarino
*Assistant Examiner*—Andrew C. Pike
*Attorney, Agent, or Firm*—Laney, Dougherty, Hessin & Beavers

[57] ABSTRACT

A mobile promotional vehicle includes a tractor cab having an elongated, substantially horizontally extending bed connected thereto. An information display superstructure extends upwardly from the bed and includes side walls which converge as they progress from the rear of the bed forwardly in the direction of the cab. These side walls are joined by a top wall, and by a vertically extending rear wall. This allows the outer surface of the side walls to be better illuminated and more visible. Multiple display panels are stored inside the side walls and can be quickly transferred to an exposed, display position in juxtaposition to the outer surface of the side walls.

11 Claims, 3 Drawing Sheets

MOBILE PROMOTIONAL VEHICLE

RELATED APPLICATION

This application is a continuation-in-part of my U.S. patent application Ser. No. 07/429,030, filed on Oct. 30, 1989, and issued on Apr. 9, 1991, to U.S. Pat. No. 5,005,893.

BACKGROUND OF THE INVENTION

1. Field Of The Invention

This invention relates to a mobile informational conveyance system, and more particularly, to wheeled, automotive trucks which carry large, exposed surface areas upon which indicia can be displayed in a highly visible fashion.

2. Brief Description of Related Prior Art

Many of the present over-the-road automotive vehicles for hauling freight are very large, and have huge cargo enclosures within trailers towed behind a tractor cab. Generally, these cargo enclosures have vertical walls and are of a generally rectangular parallelepiped configuration. Each of the sides of the trailer or truck bed thus presents a very substantial expanse of exposed visible area, which affords a large usable space for advertising indicia, promotional material, and the like. In almost every instance, however, the side walls of the trailer of the truck have been designed simply for the purpose of providing the necessary cargo enclosure at minimum expense, and so as to offer as little wind resistance as necessary, commensurate with a high strength enclosure of maximum volume for cargo carriage.

One type of truck which has been utilized for hauling various types of cargo includes walls extending upwardly from the bed and inclining inwardly with respect to the vertical so that the walls converge toward each other, and are closer at their upper edges than at the lower edges. In some instances, the walls are so inclined in order to better facilitate the mounting of a ladder alongside the wall to reach the top of the trailer for various reasons. In other instances, the walls may be made in this fashion in order to better and more stably support various types of cargo carried alongside the truck at the outer side thereof. Trucks carrying large flat sheets of plate glass are examples of such vehicles. Where such external cargo carriage is not the case, however, such inwardly inclined side walls may also afford a relatively large area which can be very advantageously used for advertising or message communication.

BRIEF DESCRIPTION OF THE PRESENT INVENTION

The present invention provides an automotive vehicle which includes a cab having a bed extending rearwardly therefrom, with a superstructure built upon, and extending upwardly from, the bed. This superstructure is in the form of an enclosure having side walls, a ceiling, a front wall, and a back wall, and may be thought of as having a primary purpose of providing an indicia display structure which can be very effectively used for advertising, promotional display, or message communication. Secondarily, the superstructure provides an enclosure which can be used for the transport of freight or cargo from one location to any destination where freight-carrying trucks are able to proceed.

Broadly described, the mobile promotional vehicle of the invention includes a cab, which is a tractor cab in the sense of containing an engine by which the vehicle is powered. Extending rearwardly from the cab is a horizontally extending, substantially rectangular bed which is supported on suitable wheels. The bed, as is conventional, has a rear edge and a pair of opposed, parallel side edges.

Projecting upwardly from the upper surface of the bed is an indicia display superstructure. The indicia display superstructure is uniquely configured in that it includes a pair of outwardly inclined walls which diverge from each other as they increase in height. Thus, the lower edges of the two side walls, which are set horizontally inwardly from the side edges of the bed, are spaced closer to each other than are the top edges of the two side walls. The side walls are also characterized in converging toward each other from the rear end of the bed forwardly therealong so that the front edges of the two side walls are closer to each other than are the rear edges thereof.

From this description, it will be seen that a horizontally extending ceiling which interconnects the top edges of the two side walls will be trapezoidal in configuration, and it will also be perceived that a front wall that interconnects the forward edges of the two side walls will also be trapezoidal in configuration.

Sources of illumination are provided along the sides of the bed, and these direct light upwardly and inwardly at a slight angle to the vertical so that it impinges upon the entire outwardly facing surface of the respective side walls of the superstructure. Thus, by reason of the outwardly inclined status of the side walls, they can be fully illuminated in a way which enables them to be more clearly viewed and observed from the roadway alongside the truck.

The convergence of the walls toward each other from the rear end of the truck toward the forward end thereof also affords advantage. The indicia, or advertising materials, carried on either one of the two side walls can generally be perceived by a person standing at a location forwardly of the truck, and slightly to either side thereof, since the walls do not extend parallel to the direction of travel of the truck, but actually are inclined inwardly with respect to the direction of travel.

An important object of the present invention is to provide an eye-catching, highly visible promotional display which is mobilized, in the sense of being transported on an automotive vehicle, and which also has the capacity for carrying either cargo, or demonstration props and additional materials which can be used in aid of the promotion contemplated by a particular visual display.

A further object of the invention is to provide a mobile promotional vehicle which has very large display surfaces for presenting visual displays in a way which permits the displays to be viewed both from the sides, and from ahead of the vehicle much better than on any types of similar mobile promotional vehicles which have been utilized in the past.

A further object of the invention is to provide a mobile promotional vehicle which allows a large and varied amount of visual promotion to be carried out through a change out of the exposed, visually observable surfaces in a rapid manner so as to change the displays which are presented without the need for heavy equipment or the efforts of personnel other than the driver of the vehicle.

Additional objects and advantages of the invention will become apparent as the following detailed description of the invention is read in conjunction with the accompanying drawings which illustrate a preferred embodiment of the invention.

GENERAL DESCRIPTION OF THE DRAWINGS

DETAILED DESCRIPTION OF A PREFERRED EMBODIMENT OF THE INVENTION

Figure 1:
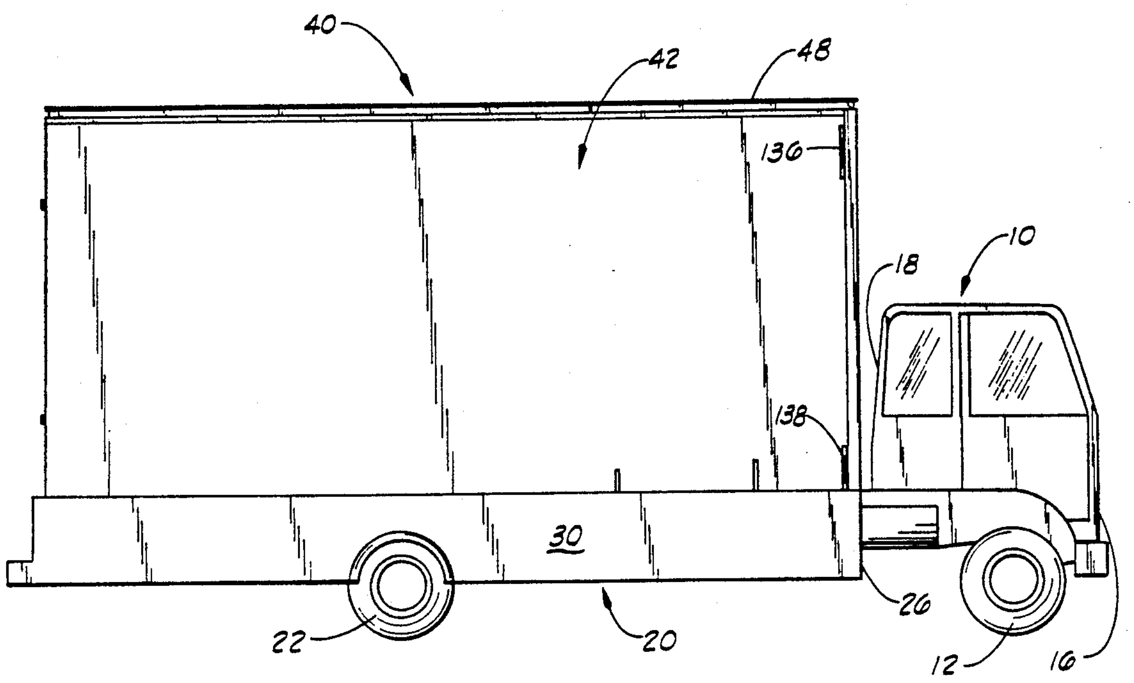
FIG. 1 is a side elevation view of the mobile promotional vehicle of the invention.

The mobile promotional vehicle of the invention includes a tractor cab 10 which is supported on ground wheels 12 and 14 and which has a forward side 16, and a rear side 18. An elongated, generally rectangular bed 20 is connected to the tractor cab 10 at the rear side thereof and projects rearwardly from the tractor cab.

The bed 20 is supported on ground wheels 22 and 24, has a forward side 26, a rear side 28, and a pair of opposed, substantially parallel, lateral sides 30 and 32. The bed 20 has a horizontal, upwardly facing floor surface 34 at the upper side thereof.

Figure 5:
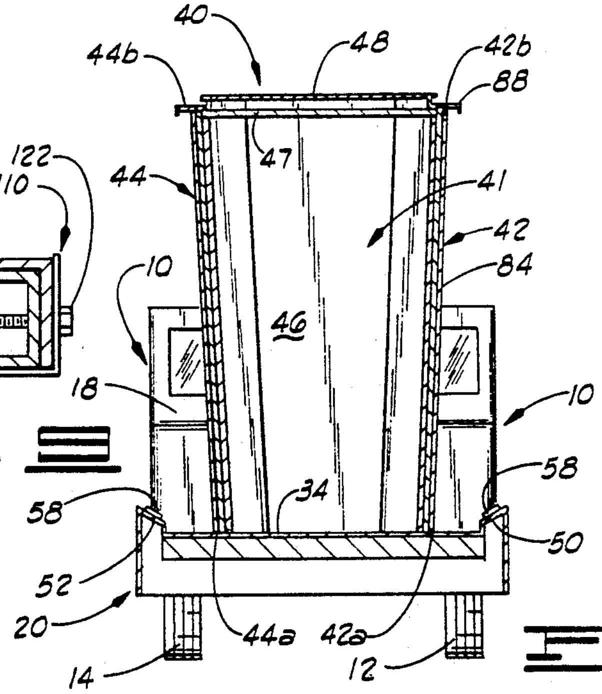
FIG. 5 is a sectional view taken along line 5—5 of FIG. 2.

An informational display superstructure 40 projects upwardly from the bed 20, and functions to define, with the bed, an enclosure 41, and also functions to provide a pair of opposed, outwardly facing indicia display surfaces as will be described. The indicia display superstructure 40 includes a pair of opposed, upwardly extending compound side walls 42 and 44 which are inclined with respect to the vertical, or lean outwardly, so that the opposed lower edges **42*a* and 44*a* of each of the compound side walls are more closely spaced with respect to each other than are the upper edges 42*b* and 44*b* of the side walls. The lower edges 42*a* and 44*a* rest upon, and are secured to, the floor 34, and are spaced inwardly from the parallel lateral side edges of the floor surface 34 as shown in FIG. 5. The compound side walls 42 and 44 of the indicia display superstructure 40 also converge toward each other as they progress or extend from the rear end of the bed 20 toward the forward end thereof so that the forward ends of the two compound side walls 42 and 44** are closer to each other than are the rear ends of the side walls.

Figure 2:
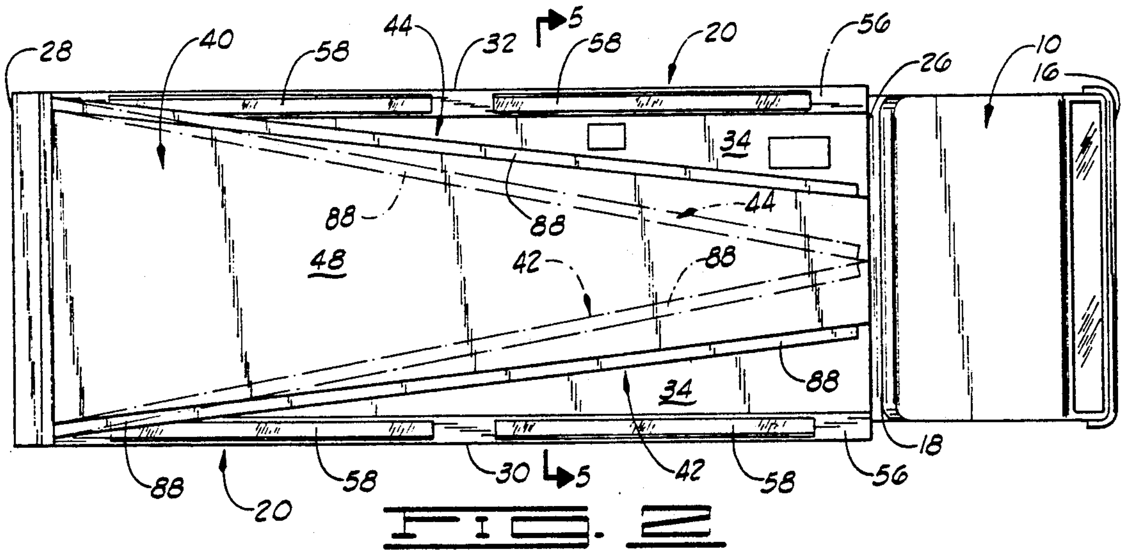
FIG. 2 is a top plan view of the mobile promotional vehicle of the invention.
Figure 4:
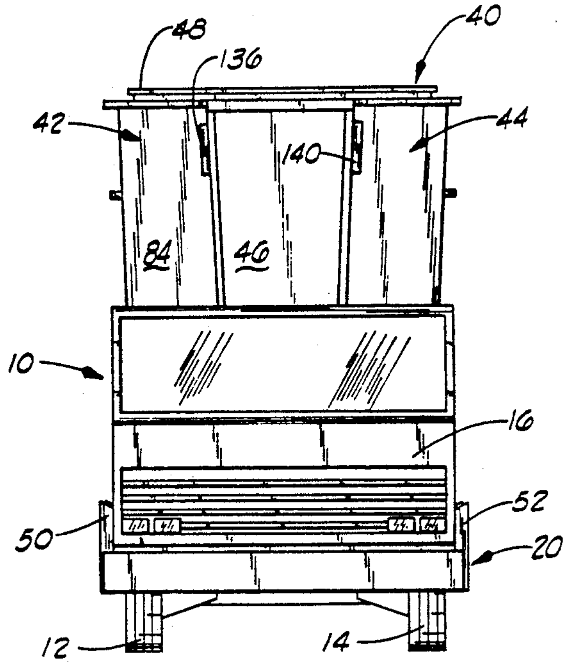
FIG. 4 is a front elevation view of the mobile promotional vehicle of the invention.

The side walls 42 and 44 may, in some embodiments, have forward vertical end edges which are horizontally spaced from each other as shown in the full line depiction of the side walls illustrated in FIGS. 2, 4, and 5 of the drawings. In another, less preferred embodiment of the invention, compound side walls 42' and 44' converge to the point where their forward ends contact each other along a vertical line at the forward side of the bed, and immediately to the rear of the cab 10. This is illustrated by phantom or dashed lines in FIG. 2 of the drawings. In this less preferred embodiment of the invention, the side walls 42' and 44' extend vertically upwardly from the floor and do not lean outwardly as in the case of the side walls 42 and 44 in the preferred embodiment of the invention. The outer surfaces of the side walls 42' and 44' will, however, be visible along and over their lengths from a point ahead of the vehicle so that a person who is approached by the vehicle will be able to see the outwardly facing surfaces of the side walls 42' and 44', and any indicia or designs carried thereon.

Figure 6:
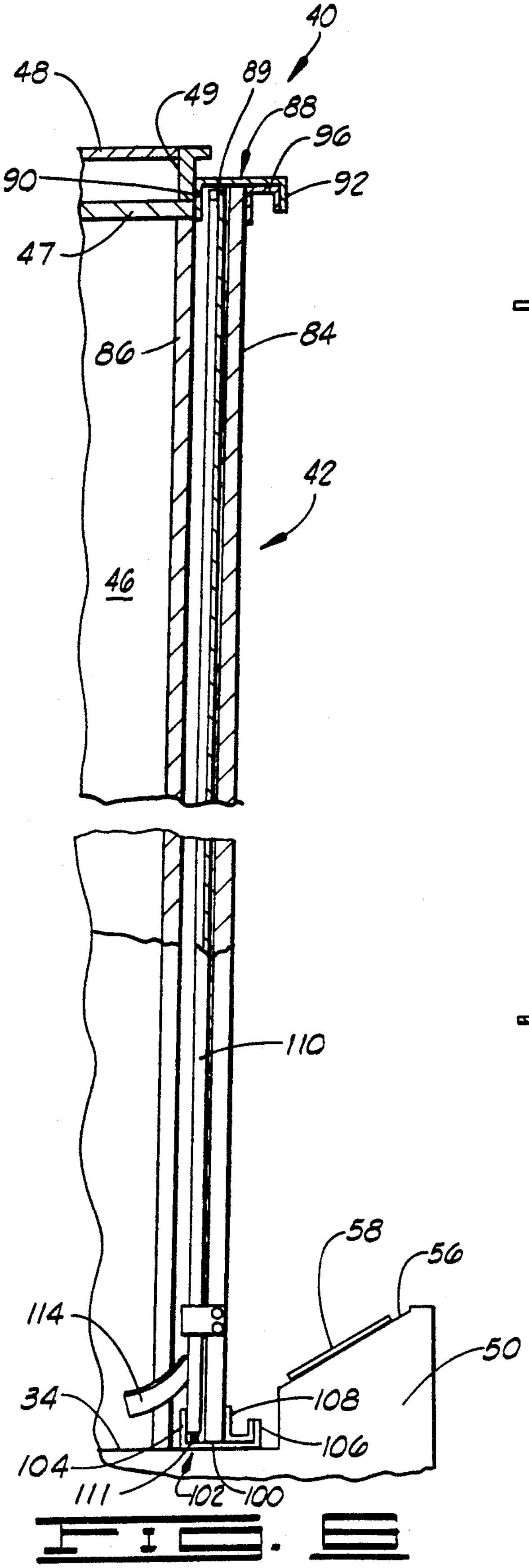
FIG. 6 is an enlarged detail view, partially in section, and partially in elevation, depicting portions of side wall channels in which certain information display panels are stored interiorly, or displayed exteriorly.

Each of the compound side walls 42 and 44 includes an outer side wall panel and an inner side wall panel which is spaced inwardly from, and extends parallel to, the outer side wall panel, so as to define a space therebetween. Thus, as shown in FIG. 6, the compound side wall 42 includes the outer side wall panel 84 and the inner side wall 86.

At the forward end of the superstructure 40, the compound side walls 42 and 44 are joined by a front or forward wall 46. The upper edges of the spaced, opposed compound side walls 42 and 44 are joined by a horizontally extending ceiling 47. A roof 48 is supported above the ceiling 47 by a pair of elongated angle beams 49. The front wall 46, ceiling 47, and roof 48 are each trapezoidal in configuration by reason of the divergence of the compound side walls in a vertical direction, and the convergence of the side walls from the rear toward the front of the bed 20. It will thus be seen that in any vertical plane extended transversely across the bed 20 so as to cut through the two compound side walls 42 and 44, a trapezoidal figure will be described in that plane between the side walls. In the same way, any horizontal plane passed between the compound side walls 42 and 44 and parallel to the floor surface 34 of the bed 20 will define a trapezoidal figure between the compound side walls 42 and 44.

Extending along the two opposed, substantially parallel lateral sides of the bed 20 are a pair of elongated light pedestals 50 and 52. The light pedestal 50 is spaced horizontally outwardly from the compound side wall 42, and the light pedestal 52 is spaced horizontally outwardly from the compound side wall 44. Each of the light pedestals 50 and 52 is supported on the bed 20 and projects upwardly from the horizontal plane of the floor surface 34. An inclined surface 56 is located at the upper side of each of the light pedestals 50 and 52 for the purpose of mounting a plurality of lights 58, or illuminating devices, therein in a way such that light will be projected upwardly against the outwardly inclined surface of the respective adjacent compound side wall 42 or 44.

It will be noted in referring to FIGS. 2 and 5 that there is a substantial amount of foot room or space left between the lower edges of each of the compound side walls 42 and 44 and the respective light pedestals 50 and 52 so that one is able to stand at this location for the purpose of painting, or arranging, or in some other way altering the type of indicia, design, advertisement, or display which appears on the outwardly facing display surfaces of the two upwardly extending compound side walls 42 and 44.

Figure 3:
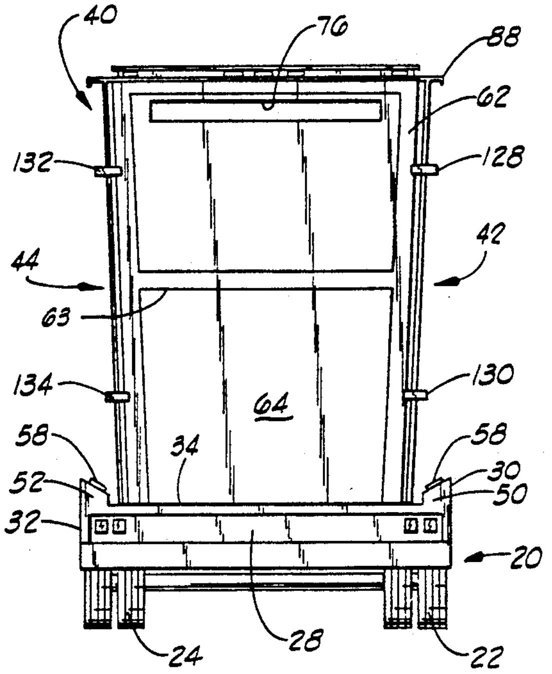
FIG. 3 is a rear elevation view of the mobile promotional vehicle of the invention

At the rear end of the upwardly extending superstructure which includes the compound side wall 42 and 44, and the forward wall 46, the superstructure carries an upwardly extending, generally trapezoidally-shaped rear wall 62. The rear wall 62 defines an opening 63 adjacent the lower part thereof to accommodate a canopy panel 64. The canopy panel 64 functions as a closure for the opening 63, and is hinged at its top edge to the back wall 62 so that it can pivot about a horizontal axis. The canopy panel 64 is shown in FIG. 3 in its closed position, and is shown opened out to its horizontal, rearwardly extending position in FIGS. 7 and 8. When the canopy panel 64 is moved outwardly to the position shown in FIGS. 7 and 8, its raising to the illustrated position is assisted by a pair of spring assisted air piston and cylinder lifting subassemblies 66 and 68.

Figure 7:
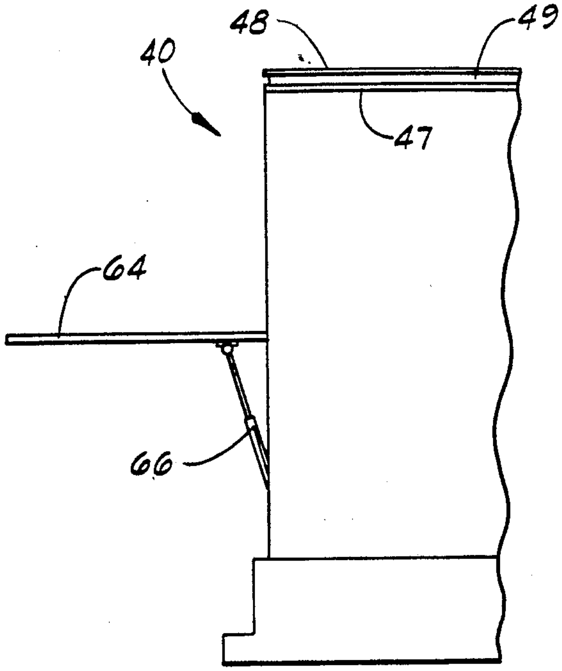
FIG. 7 is a side elevation view of the rear portion of the mobile promotional vehicle, showing the exhibition canopy panel opened out to its horizontally extending protective position.

The air piston and cylinder subassemblies 66 and 68 are simply air-cushioned type devices which contain a spring, and which function, as is well understood in the art, to assist in lifting the canopy panel 64 from its closed position (as illustrated in FIG. 3 of the drawings), to its raised position as illustrated in FIGS. 6 and 7. When the canopy panel 64 is raised as shown in FIGS. 6 and 7, a large opening is formed in the rear wall 62 immediately beneath the raised canopy panel and this affords access to the interior of the superstructure. Various types of demonstration props and other devices useful in promoting a product, or in giving an educational demonstration, can be stored inside the superstructure. When the canopy panel 64 is lifted in the manner described, it affords shade when there is intense sunlight in the area where the demonstration is to be carried out, and it also affords some shelter from rain and other precipitation when such is needed.

Figure 8:
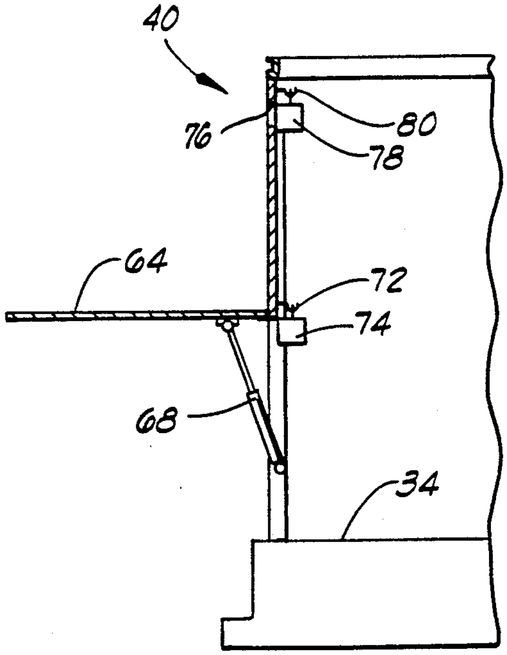
FIG. 8 is a side view, partially in section and partially in elevation, illustrating a pair of LED devices used during the presentation of a display or exhibition from the rear of the mobile promotional vehicle at a time when the exhibition canopy panel is raised to its elevated position as shown in FIG. 7.

Transversely spaced across the back wall 62 in line with the pivotal axis of the canopy panel 64, and on opposite sides thereof, are a pair of hooks 72, one of which can be perceived in FIG. 8. The hooks 72 function to support a light emitting device sign 74 which can be extended across the upper side of the opening formed when the canopy panel is lifted. This permits a message to be communicated from the sign to persons who may be viewing a demonstration or exhibition conducted at the rear of the vehicle and beneath the canopy panel 64. In the upper portion of the back wall 62, an elongated slot or opening 76 is formed which extends transversely across the back wall near the upper edge of the back wall. The slot 76 enables another indicia carrying device, such as an LED (light emitting device) sign 78 to be placed behind the opening 76 and visible to persons at the rear of the mobile promotional vehicle. The sign 78 can be suspended on hooks 80 in the manner previously described.

In the illustrated embodiment of the invention, the compound side walls 42 and 44 each include, as previously mentioned, an outer side wall panel 84 and an inner side wall panel 86. This construction is illustrated in FIG. 6 of the drawings. The outer side wall panel 84 has its upper edge received within a downwardly opening, C-shaped upper channel 88, and secured to the web portion 89 of the channel at approximately the center thereof. The channel opens downwardly as shown, and includes an inner leg 90 and an outer leg 92 on opposite sides of the web portion 89. A small U-shaped downwardly opening upper track element 96 is secured between the outer side of the outer wall panel 84 and the outer leg 92 of the upper channel 88 as shown in FIG. 6.

The lower edge of the outer side wall panel 84 rests upon, and is secured to, a central portion of the web 100 of an upwardly opening C-shaped lower channel 102. The lower channel 102 also includes an inner leg 104 and an outer leg 106 joined to the web 100. It will be noted that the lower channel 102 rests upon, and is secured to, the upwardly facing surface of the floor 34. The lower channel 102 also supports, and has secured thereto adjacent its outer leg 106, a relatively small, upwardly opening lower track 108.

It will be noted in referring to FIG. 6 that the inner side wall panel 86 is spaced inwardly from the outer side wall panel 84 by a significant spacing which is at least as wide as the distance between the central portion of the web 89 of the upper channel 88 (to which the outer side wall panel 84 is attached) and the inwardly positioned inner leg 90 of the upper channel.

The described compound wall construction permits a plurality of extra movable display panels to be accommodated in storage. These movable panels ca be utilized to provide additional options for providing promotional or educational displays. Thus, there are stored within the space between the outer side wall panel 84 and the inner side wall panel 86, a plurality of movable display panels 110 of which one is illustrated in FIG. 6. Each of the movable display panels 110 has a height which is slightly less than the height of the outer side wall panel 84.

At its lower end, each of the movable display panels 110 carries a plurality of rollers 111 so that it can be rolled along the track formed by the web portion 100 of the lower channel 102 and the inner leg 104 thereof, as well as the corresponding upper track formed by the inner side of the upper channel 88.

The movable display panels 110 may be of varying widths, but preferably have a width which is from about one-third to one-fourth the total width, from back to front, of the outer side wall panel 84. The display panels 110 can be substantially any width, however, provided that their weight is not so great as to make them difficult to manually remove from the storage position illustrated in FIG. 6 and placed outside of the respective outer side wall panel 84 so as to afford an alternative visual display facing outwardly from the outer side of the indicia display superstructure 40.

When the movable display panels 110 are moved from their stored position within the outer side wall panels 84 by extricating them to the rear of the vehicle, in a manner hereinafter explained, they can then be located in a visually exposed position to the outer side of the indicia superstructure 40. This is accomplished by sliding them into the tracks formed by the upper track 96 and the lower track 108, carried at the outer side of the upper and lower channels 88 and 102, respectively, on each side of the display superstructure 40. The movable display panels can be moved easily to a selected location along either of the respective outer side wall panels 84 by reason of the rollers 111 mounted on the lower edge of each of these movable panels.

Several movable indicia display panels 110 are carried in the stored position inside the outer side wall panel 84 so as to be rollably movable in the tracks formed by the C-shaped upper channel 88 and the C-shaped lower channel 102. They are in serial order within this space—that is, a first of the movable panels 110 is located adjacent the forward side of the indicia display superstructure 40, and is in closest proximity to the cab 10. Immediately following this, another of these movable display panels will be located in coplanar alignment with the first of the display panels. Then the rearmost display panel will be located to the rear of the second of the display panels, but in coplanar alignment with each of the display panels. This storage array of movable display panels 110 is duplicated on opposite sides of the indicia display superstructure.

When it is desired to place one or more movable display panels 110 in a position for visual observation for use in advertising or demonstration at the outer side of the outer side wall panel 84, an elongated flexible strap 114 is provided for commencing this procedure. The strap 114 is of a length such that a free end of the strap can extend to an accessible position at the rear of the truck. It is shown projecting out of the space between the outer side wall panel 84 and the inner side wall panel 86 of FIG. 6 of the drawings.

Figure 9:
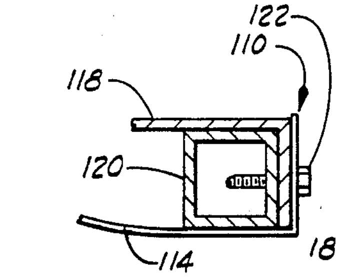
FIG. 9 is a partially sectional, partially elevational view of a part of one of the movable information display panels used in the invention.
Figure 10:
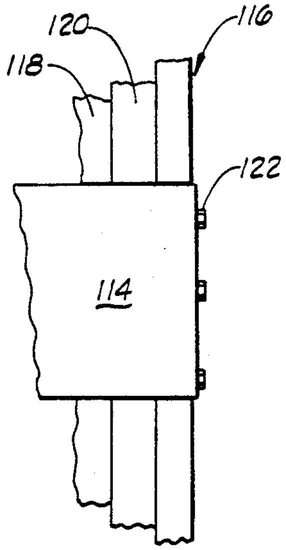
FIG. 10 is a view in elevation of a structural detail which includes a part of the movable information display panel of the type shown in FIG. 9.

The flexible strap 114 extends all the way to the leading edge of the forward movable indicia display panel 110 which is, as previously explained, located in closest proximity to the tractor cab 10, or, stated differently, adjacent the forward wall 46 of the indicia display superstructure 40. The strap 114 is secured to the leading side of the forward movable display panel by the use of screws 122 in the manner shown in FIGS. 9 and 10. Here a portion of the forward or leading portable display panel 110 is illustrated. Each movable panel 110 includes an exposed indicia display plate or panel 118 which is secured along its longitudinal forward edge to a square cross-sectioned tubular frame section 120. One form of securement which may be used is to form a right angle bend in the end of the panel 18 into which the square tubing 120 will fit.

The flexible strap 114 used to extricate the movable display panels 110 from their storage positions is shown extending to the leading edge of the forward display panel 110, and being there secured by means of suitable screws 122 to both the bent over part of the plate 118 and the square tubing 120. It will be perceived from this description that at such time as it may be desirable to extricate or remove one or more of the portable indicia display panels 110 from its storage place between the outer side wall panel 84 and the inner side wall panel 86, the flexible strap 114 is gripped and pulled. This causes all three of the aligned coplanar portable indicia display panels 110 to move upon their respective rollers 111 so as to roll rearwardly in the track formed at the inner side of the C-shaped lower channel 102.

The operator of the system can use either one or two or all of the movable display panels 110, and will need only to selectively pull the leading panel a sufficient distance to the rear to eject one, two, or three of the portable movable display panels. Once the movable display panels 110 have been moved out of their storage position, they may be manually placed in the outer track system formed by the upper track 96 and lower track 108. Again, the movable display panels 110 can be rolled forward in these upper and lower tracks formed by these U-shaped channel elements until they are positioned at the locations needed to display the indicia carried thereon in the manner desired by the operator. In most instances, all of the movable panels will be used by positioning them in coplanar array in fore-and-aft alignment outside the outer side wall panels.

For the purpose of retaining the movable indicia display panels 110 in their stored positions, or, alternately, in their outwardly facing display positions on the outer side of the outer side wall panel 84, a plurality of retainer plates 128, 130, 132, and 134 are utilized to block or close the storage space in which the movable panels are stored, and also to limit or arrest the rearward movement of the movable panels when they are in a display position against the outer surface of the outer side wall panel 84. Similar stop plates 136, 138, 140, and 142 are provided at the forward end of the indicia display superstructure 40 to prevent the panels from rolling out of their respective tracks 96 and 108 at a time when they are in the display position. When it is desired to remove the panels, the retaining plates 128, 130, 132, and 134 are simply removed by removing suitable fasteners (not shown) by which these plates are retained in a blocking or arresting position.

UTILIZATION

In utilizing the mobile promotional vehicle of the invention, a product promotion can be developed utilizing appropriate messages and displays placed on the outwardly facing surfaces of the opposed outer side wall panels 84 forming a part of the upwardly extending compound side walls 42 and 44. Because these display surfaces carried on the outer side wall panels 84 lean outwardly with respect to the vertical, the electric lights 58 mounted on the light pedestals 50 and 52, and focused in a direction which is slightly inwardly with respect to the vertical, will fully illuminate the display carried on the outwardly facing surfaces. Improved visibility is thus afforded by this construction.

It will also be noted that, because the upwardly extending compound side walls 42 and 44 converge toward each other in the direction toward the forward end of the truck bed 20, their outer surfaces are more visible from locations ahead of the truck as it approaches the observer. As is commonly understood, a vehicle is usually more closely observed at times when it is approaching an observer, than at times when it is going away from the observer. Safety considerations dictate that such be the case. It is therefore important that, if possible, the indicia carried on the outwardly facing surfaces of the outer side wall panels 84 be most visible at a time when a person is ahead of the truck and watching it approach. The convergence of the side wall structures toward each other assures enhanced visibility for these surfaces at this time.

The mobile promotional vehicle of the invention enables a number of promotional props and materials to be carried inside the enclosure formed by the compound side walls, forward wall and back wall of the indicia display superstructure 40. When the vehicle has arrived at a location where it is desired to conduct a demonstration or promotion, the canopy panel 64 can be lifted upwardly with the assistance of the air cylinder subassemblies 66 and 68 until it extends horizontally rearwardly as shown in FIGS. 6 and 7. The light emitting devices can also be placed in position and illuminated at this time to communicate a message as desired. The demonstration can then be started and carried out at a location at the rear of the vehicle and beneath the shelter of the canopy panel 64.

At any time it is desired to change out the particular message or display (or conduct a different promotion), this can be accomplished by using the movable display panes 110 stored inside the indicia display superstructure between the outer side wall panel 84 and the inner side wall panel 86. These movable panels 110 will often carry an entirely different promotion for perhaps a different product or service, and are made up in their serial arrangement so that the parts of the display or design interfit to make a composite picture, or message. The panels 110 are, of course, placed side by side by rolling them along the tracks 96 and 108 located on the outwardly facing sides of each of the outer side wall panels 84.

It will be understood, of course, that a different promotion or a different message can be placed on each of the opposite sides of the indicia display superstructure, and need not be the same or even related on each other. The display on each side is susceptible to being rapidly changed out to present a different message by the simple expedient of pulling of the movable panels out of their stored position, and placing them on the outer side of the outwardly leaning, upwardly extending compound side walls of the superstructure.

From the forgoing description of the invention, it will be perceived that the present invention provides a novel, highly useful mobile promotional vehicle which can display, in a highly visible fashion, any type of product promotional designs or material, or any educational demonstration materials which may be desired. The construction provided allows the highly visible display to be quickly changed out in a short time, and without the use of booms, cranes, forklifts or other aids to manual manipulation of the movable display panels.

Although various changes and innovations can be made in the illustrated and described embodiment of the invention, such changes are deemed to be circumscribed by the spirit and scope of the invention except as the same may be necessarily limited by the appended claims when the same are accorded a reasonably expansive interpretation.

What is claimed is:

1. A mobile promotional vehicle comprising:
   a wheel-supported tractor cab having a forward end and a rear end;
   a wheel-supported bed connected to the rear end of said tractor cab and projecting rearwardly therefrom, said bed having a forward end, a rear end, and a rectangularly configured, upwardly facing floor surface, said floor surface bounded by opposed, substantially parallel side edges; and
   an informational display superstructure extending upwardly from said bed, said superstructure having a forward end and a rear end, and further including:
   a pair of opposed, upwardly extending side walls each having an outwardly facing indicia display surface and having a lower edge adjacent the floor surface, and each having an upper edge, and each having a forward end, said walls extending from the rear end of said bed toward the forward end thereof over a length of each of said side walls, and converging toward each other as the side walls progress from the rear end of the bed toward the forward end thereof so that said side walls are adjacent each other at the forward end of said bed and spaced apart from each other at the rear end thereof, the lower edges of the respective side walls being spaced inwardly from the parallel, opposed side edges of said floor surface whereby portions of said floor surface lie outwardly from the respective lower edges of each of said side walls, those portions of said floor surface lying outwardly from the lower edges of said side walls oriented to direct light upwardly against, and illuminate said outwardly facing indicia display surfaces on the two side walls, said outwardly facing indicial display surface of each of said two side walls being illuminable from below, and visible from ahead of the cab of said vehicle over substantially the entire length of the respective side wall; and
   a ceiling interconnecting the upper edges of said side walls.

2. A mobile promotional vehicle as defined in claim 1 wherein each of said upwardly extending side walls is a compound wall and includes:
   an outer side wall panel; and
   an inner side wall panel spaced inwardly from, and extending substantially parallel to, said outer side wall panel;
   and wherein said mobile promotional vehicle further includes a plurality of indicia display panels disposed between said inner side wall panel and said outer side wall panel; and
   means for supporting any one of said display panels in juxtaposition to a selected one of either of said two outwardly facing indicia display surfaces of said side walls, and parallel to the respective side wall.

3. A mobile promotional vehicle as defined in claim 1 wherein said side walls are horizontally spaced from each other at the forward ends thereof.

4. A mobile promotional vehicle as defined in claim 1 wherein said walls lean outwardly as they project upwardly from the floor, and diverge in an upward direction.

5. A mobile promotional vehicle as defined in claim 1 wherein said walls converge at the forward ends thereof to contact each other along a vertical line.

6. A mobile promotion vehicle as defined in claim 1 further including track means along the upper edge and bottom edge of each of said side walls for mounting indicia display panels in said track means, and adjacent and outwardly of the indicia display surface of the respective side wall when one of said display panels is mounted in the track means adjacent the top edges and bottom edges of the respective side wall.

7. A mobile promotional vehicle as defined in claim 1 further including:
   means for storing a plurality of display panels inside of, adjacent, and substantially parallel to, each of said side walls; and
   means for supporting any of said display panels in juxtaposition to said outwardly facing indicia display surfaces of said side walls and parallel to said side walls.

8. A mobile promotional vehicle as defined in claim 7 further including track means along the upper edge and bottom edge of each of said side walls for mounting of indicia display panels in said track means.

9. A mobile promotional vehicle as defined in claim 1 further including:
   a generally vertically extending back wall extending between said side walls at the rear end of said superstructure, and having a lower portion, said back wall defining a generally rectangular first opening in the lower portion thereof;

an overhead canopy panel filling and closing said first opening and having an upper edge hingedly connected to said back wall at a top of said first opening to facilitate outward and upward swinging movement to a horizontally extending position in which the canopy panel projects rearwardly from the back wall at a level spaced upwardly from the bed; and at least one extensible piston rod and cylinder subassembly connected between said canopy panel and back wall for assisting in manually opening said canopy panel and supporting said canopy panel in the horizontally extending position.

10. A mobile promotional vehicle useful for displaying indicia over a large, visible surface area comprising:

a bed supported on wheels and including opposed, substantially parallel, horizontally extending side edges, a forward end, and a rear end;

a pair of opposed, upwardly extending side walls having an inner side, and having an outer side carrying an outwardly facing indicia display surface, and each having a top edge and a bottom edge adjacent said bed, said side walls converging toward each other from a location near the rear end of said bed to a point of closest convergence of the side walls at the forward end of said bed, each of said side walls having the bottom edge thereof spaced horizontally inwardly from the nearest adjacent side edge of the bed; and upwardly and inwardly directed light sources positioned along at least a portion of each of the opposite side edges of said bed, and oriented to direct light against, and illuminate, the outwardly facing display surfaces of said side walls, said light sources being spaced outwardly from said side walls to provide a space between said light sources and said side walls to facilitate standing and walking to change, repair, or alter the indicia displayed upon said side wall indicia display surfaces.

11. A mobile promotional vehicle as defined in claim 10 wherein each of said side walls is a compound wall including an outer side wall panel forming the outer side, and an inner side wall panel forming the inner side and spaced inwardly from said outer side wall panel, said inner and outer side wall panels of each of said side walls defining between them a storage space for storing movable display panels.

* * * * *